Feb. 3, 1970    L. W. RICKETTS, JR., ET AL    3,493,734
AUTOMATIC LINE INTEGRATOR
Filed July 27, 1965                           14 Sheets-Sheet 1

| FIG. 4. | FIG. 7. | FIG. 10 | FIG. 13. |
| FIG. 5 | FIG. 8. | FIG. 11 | FIG. 14 |
| FIG. 6. | FIG. 9. | FIG. 12. | FIG. 15. |

INVENTORS.
LUTHER W. RICKETTS, JR.
and GEORGE L. BUENGER

BY *Lockwood, Woodard, Smith & Weikart*
Attorneys

INVENTORS.
LUTHER W. RICKETTS, JR.
and GEORGE L. BUENGER

INVENTORS.
LUTHER W. RICKETTS, JR.
BY and GEORGE L. BUENGER
Lockwood, Woodard, Smith & Weikart
Attorneys INVENTORS.
LUTHER W. RICKETTS, JR
and GEORGE L. BUENGER
BY
Lockwood, Woodard, Smith & Weikart
Attorneys INVENTORS.
LUTHER W. RICKETTS, JR.
BY and GEORGE L. BUENGER
Lockwood, Woodard, Smith & Weikart
Attorneys

United States Patent Office 3,493,734
Patented Feb. 3, 1970

3,493,734
AUTOMATIC LINE INTEGRATOR
Luther W. Ricketts, Jr., Urbana, and George L. Buenger, Champaign, Ill., assignors to The Magnavox Company, Fort Wayne, Ind., a corporation of Delaware
Filed July 27, 1965, Ser. No. 475,054
Int. Cl. G06f 7/38
U.S. Cl. 235—156                              14 Claims

ABSTRACT OF THE DISCLOSURE

An integrator receives signals from different input sources and integrates each source signal with previously integrated signals from the same respective signal source. The integrated signals thus provide an up-to-date representation of their respective signal sources. The integration times and the integration curves may be selected.

---

This invention relates generally to integrating devices, and more particularly to an integrator capable of producing the integrals of a plurality of input signals.

Although many integrating devices are known, situations are encountered where it is desirable to be able to generate a linear or non-linear integral for each of a large number of input signal sources. It is therefore a general object of the present invention to provide an integrator which can produce the time integrals of signals from each of a large number of different signal sources.

A further object is to be able to easily select a linear or non-linear integration and to select an integration curve where a non-linear integration is selected.

A further object is to provide a device for achieving the foregoing objects with a minimum of equipment.

Described briefly a typical embodiment of this invention digitally integrates signals from many analog signal producing sources. Each source may produce an analog signal which may vary continuously and represent some condition of interest, such as velocity or temperature, for example. The analog signals are not applied directly to the input of the present invention but are first converted to digital signals by an analog to digital converter of conventional construction, not a part of this invention. The present invention does not receive the signals from all sources simultaneously, but in sequence.

Because the integral of signals derived from each source is stored in a separate address in a magnetic core memory, the addressing of the memory and sampling of sources is synchronized by an address counter, the synchronizing means itself being of conventional construction and not a part of this invention. For example, if the various analog signal sources can be distinguished readily by frequency, their outputs can be applied to a variable frequency filter whose by-pass frequency is changed at times determined by the address counter. The analog signal passing the filter at any particular time is converted to digital, applied to the input of the present invention, sampled, integrated, and the integral returned to the memory address corresponding to the source from which signals at that frequency are derived. Then the address counter advances to the next memory address, simultaneously changing the filter frequency for integration of a signal from the next one of the signal sources.

The value of each integral is represented by a multi-digit binary word. When a value is to be updated, it is read out of the memory in parallel to a sense register. It is then shifted out of the sense register, and through arithmetic means for updating, and into a write register. Beginning immediately after the read-out is initiated, and between that time and commencement of shifting the word out of the sense register, the input is sampled, with the results of the sampling being stored in an input counter or other means, to be used for updating the integral as it is shifted through the arithmetic means. For this purpose the output of the input counter, or other sampling means employed, is applied to the arithmetic means.

When the new value of the integral has been shifted into the write register, it may be applied through gates to a ladder network, or by some other means may be converted to an analog signal representing the number in the write register. The analog signal output may be applied to threshold circuitry to produce a digital output for each integral which exceeds a set threshold value and to produce an alarm signal whenever any integral exceeds the set threshold level.

The integral in the write register is then written into the memory address from which its old value was read.

A two-position manually operable selector switch is provided for selection of either a linear integration or an R-C type of integration. For the R-C integration, the charge and discharge rates can be selected by a manually positionable, multi-position decrement switch. As mentioned above, each integral is stored and processed as a multi-digit binary number. The degree of influence of the input signals on this number can be established by a multi-position manually positionable input weighting switch.

However, instead of manually operable switches for programming, the invention may employ programming input signals to establish the type of integration, rates, and weights.

The full nature of the invention will be understood from the accompanying drawings and the following description and the claims.

Figures 1, 3:
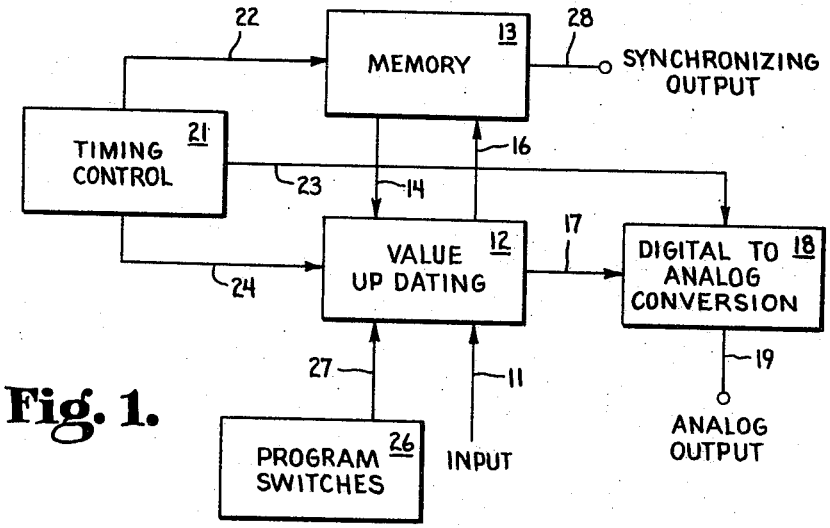
FIG. 1 is a simplified block diagram of a typical embodiment of the present invention.
FIG. 3 shows the arrangement of subsequent figures of drawing which, when assembled as shown in FIG. 3, complete a properly interconnected logic diagram of the typical embodiment.

Referring now to the simplified block diagram of FIG. 1, the signals to be integrated are applied at 11 to the value updating block 12. Integrals are read out of the memory 13 and applied at 14 to the value updating block, and are updated in accordance with the input at 11, and the new integral values are returned at 16 to the memory. The new integral values are also taken out of the updating block 12 at 17 and applied to the digital to analog conversion block 18 from which an analog output is derived at 19.

The timing control block 21 is coupled at 22 to the memory, at 23 to the digital to analog conversion means, and at 24 to the value updating block. Manually operable program switches in block 26 are coupled to the value updating block 12 at 27 to enable the selection of the type of integration to be performed on the input signals. A synchronizing output 28 is provided from the memory for coupling to the means providing the input signal at 11, so as to synchronize the input signal producing means with the memory addressing so that the integral in each address of the memory is representative of the integral of signals derived from one of a plurality of sources.

Figure 2:
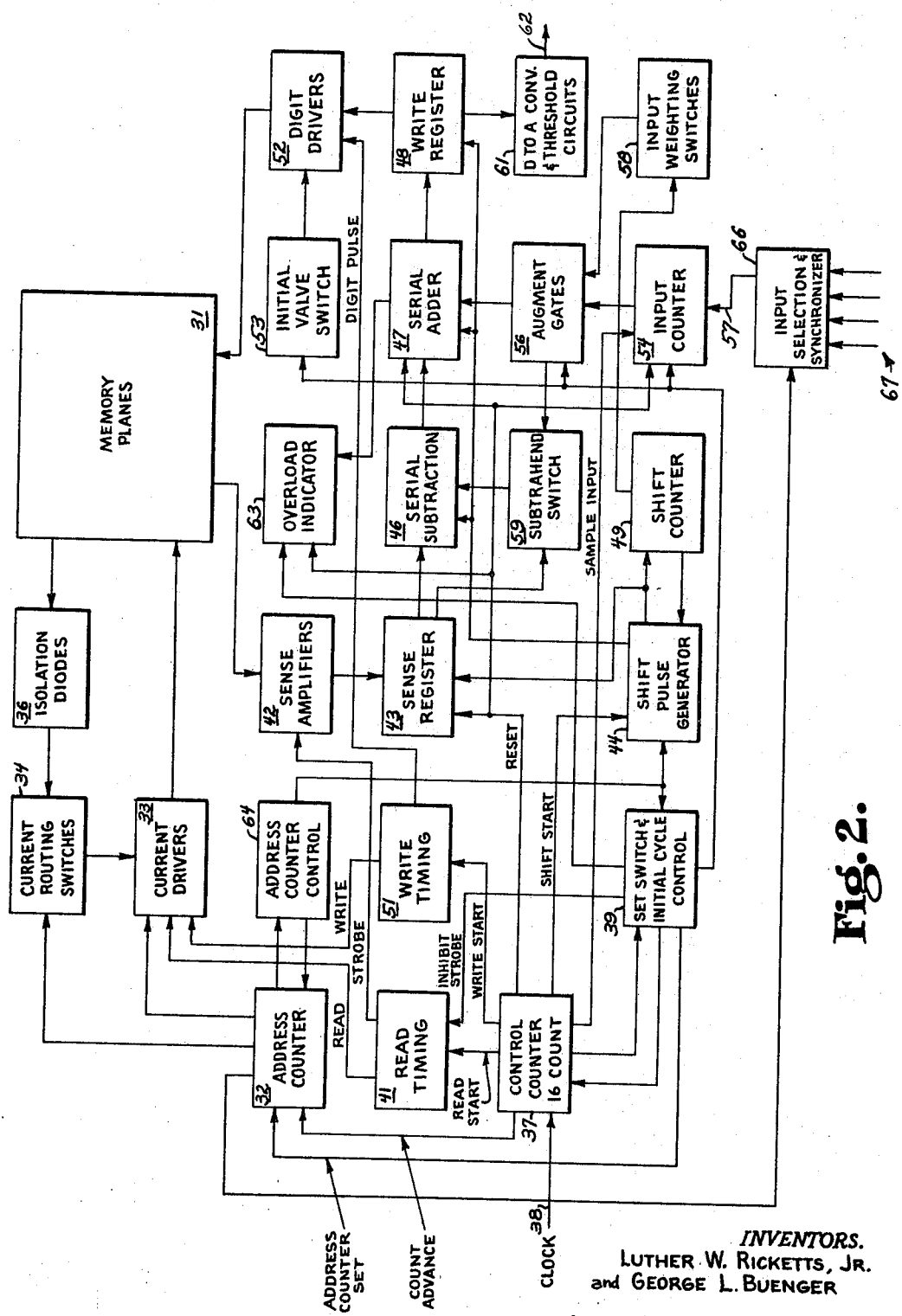
FIG. 2 is a detailed block diagram thereof.

Referring now to FIG. 2, the memory which may be employed for storing eleven-bit word integrals of signals from 950 signal sources, for example, includes an array of eleven 32 by 32 four wire coincident current magnetic core memory planes in the block 31. More or less than eleven could be used, depending upon the number of digits desired in the integrals. To handle this memory, a conventional 1024 count address counter 32 is employed, with the usual decoding gates connected to current drivers 33 and current routing switches 34 cooperating to designate the memory address in the planes 31 for reading and writing the integrals in the memory. Isolation diodes 36 are employed between the drivers and routing switches to prevent addressing current pulses from taking paths other than desired for the proper addressing of any one of the addresses.

For timing purposes, a conventional 16 count binary counter may be employed as the control counter 37 and is driven by a clock pulse input 38 which may be derived from an internal or external clock. As the control counter, it controls the sequence of events during the normal operation of the integrator. There are outputs from the control counter to many of the other blocks whereby the sequence of events is controlled.

The sequence of events timed by the control counter is repeated for each word in the memory as the address counter advances, and the period established for whatever events are required for updating an integral, may be referred to as the word processing period. Means other than a counter may also be used for establishing word processing periods.

An initial cycle control block 39 has outputs going to initial value switch, augment gates, input counter and read timing blocks to control the writing of the initial value into all memory addresses each time the set switch is actuated. The output going to the address counter insures that the initial value is loaded starting with the first address. The input signal from address counter indicates when the last address has been loaded with the initial value and stops this loading process. Signals to and from the control counter block control the timing of signals to other blocks.

An output to the overload indicator block provides for the resetting of an overload indicator signal each time the set switch is actuated.

An output from the control counter block 37 is applied to the read timing circuit block 41 which includes a group of single shots having an output to the current drivers 33 and a strobe output to the sense amplifiers 42. Thus the control counter initiates the reading of an integral out of the memory planes 31 through the sense amplifiers 42 to the sense register 43. An additional input to the read timing circuitry 41 is provided from the initial cycle control block 39 to avoid the reading of an integral from the memory when a new cycle is to be started as determined by actuation of the set switch.

The control counter also has an output to the shift pulse generator 44, to initiate generation of shift pulses at the proper time after an integral is read from the memory. The shift pulse generator has a repetition rate much higher than the input clock pulse rate to the control counter so that an eleven-bit word can be shifted from the sense register 43 through the serial subtractor 46 and serial adder 47 into the write register 48 within the time period between odd counts of the control counter. Accordingly, an output of the shift pulse generator is connected to the serial subtractor as well as to the serial adder 47 and the write register 48 so that the integral in the sense register 43 can be shifted through the serial subtractor and serial adder for updating, and into the write register, during the time period between counts of the control counter.

In addition to the output of the shift pulse generator which is coupled to the serial subtractor, serial adder, and write register, an output is coupled to the sense register and to the shift counter 49. The shift counter is a 12 count binary counter and has an output to the shift pulse generator to terminate pulse generation after enough pulses have been generated to shift the eleven bit old integral out of the sense register, through the arithmetic for updating, and into the write register.

The control counter 37 also has an output to the write timing circuitry 51 which has an output to the current drivers and to the digit drivers 52 for writing a word from the write register 48 into the memory planes.

It was mentioned previously that an output from the initial cycle control block 39 to the read timing circuitry 41 is provided to avoid read out when a new cycle is to be started by activation of the set switch. There is also an output from the initial cycle control 39 to an initial value switch 53 connected to the digit drivers 52. The initial value switch is manually operable and can be set in any one of a variety of positions to store in each address of the memory a certain value as determined by the position of the switch, when a new cycle is started.

The initial cycle control 39 also has an output to an input counter 54 and augment (augend) gates 56 to enable input signal sample counting to begin after the initial value has been loaded into all addresses.

In the illustrated embodiment, the input signal to the integrator is applied at 57 to the input counter and is in the form of either a logic "0" or logic "1," depending upon the signal at the source from which the input signal was derived. During a word processing period, the control counter applies a sample pulse twice to the input counter, and the output from the input counter to the augment gates is indicative of whether the input 57 was a logic "1" neither time it was sampled, one time it was sampled, or both times it was sampled. Input weighting switches 58, manually positionable as a group, and having an output gated at 56 to the serial adder, have an input from the shift counter 49, which enables the weighting switches to determine the significance of the input counter output in updating the integral.

The illustrated embodiment of the invention is capable of integrating according to either of two equations as follows:

$$(1) \quad I_n = I_o - \frac{I_o}{2^n} + X_1 2^{k_1} + X_2 2^{k_2}$$

$$(2) \quad I_n = I_o - X_o 2^{k_1} + X_2 2^{k_1}$$

wherein $I_n$ is the new value of the integral and $I_o$ is the old value of the integral, the exponent $k_1$ is determined by the position of the input weighting switches 58 in FIG. 2, $k_2$ equals $k_1+1$, the $n$ exponent is a value determined by the position of a multi-position, manually-operated decrement switch 59 in FIG. 2, and the coefficients "X" are determined by whether the sampled input signal was a logic "1" neither, once or both times sampled. In other words, if the input signal was a logic "1" once during the sampling, the value of the coefficient $X_1$ would be 1. If the input signal was a logic "1" twice during the sampling, the value of coefficient $X_1$ would be 0 and the value of coefficient $X_2$ would be 1. If the input signal was a logic "1" neither time sampled, coefficient $X_o$ would be 1, and the other coefficients would be 0.

Equation No. 2 above represents a linear integration whereas Equation No. 1 represents an RC integration. The equation which is used depends upon the position of a two-position, integration mode selector switch coupled between the weighting switches and the augment gates.

In addition to the output from the write register to the digit drivers, there is the output to the digital-to-analog converter and threshold circuits 61. If the analog voltage exceeds a threshold voltage set by adjusting a potentiometer in the block 61, a voltage will be produced at the output 62. This output can be used to control the intensity output of a pen recorder, sychronized with the address counter of the memory.

An overload indicator may be provided in the form of a light which will be turned on when there has been an overload in either the serial adder or serial subtractor, both of which have outputs to the overload indicator. This indicator also has an input from the initial cycle control block 39 so that when the set switch has been activated to initiate a cycle, the overload indicator, if previously lighted, will be extinguished. The overload indicator 63 also has an input from the control counter, which causes activation of the overload indicator when the control counter returns to zero in the event that an overload has occurred in either the serial subtractor or serial adder, either of which will apply an enabling input to the overload indicator.

The address counter control 64 has inputs from and outputs to the address counter and in the illustrated embodiment, has a manually operable 3-position switch therein for selecting the mode of operation of the address counter.

Referring further to FIG. 2, an output is provided from the address counter 32 to the input selection and synchronizer 66 having inputs from a plurality of analog signal generating sources, four of which are shown and designated by the reference numeral 67. The synchronizer in the block 66 is for the purpose of assuring that the signal provided therefrom to the input counter during a word processing period is from the same source as that from which the integral to be processed during the period has been derived. The source of signals being processed is, therefore, the one corresponding to the memory address determined by the state of the address counter.

The analog-to-digital converter portion of the block 66 produces, during the sampling period, a logic "0" or logic "1" output for such duration as may be dictated by the level of the analog signal applied thereto. A device for achieving this result may be an adjustable threshold system of the same general nature as that described hereinbelow to use the output of the present invention to operate an alarm. The synchronizing device may be of the variable frequency filter type referred to in the brief description of the invention herein.

FIGURES 4 through 15, arranged in accordance with the drawing of FIG. 3, comprise one of many possible logic diagrams for the practice of the invention. In order to facilitate understanding of this particular logic diagram, it may be helpful to describe briefly some conventions used throughout, together with the general nature of the various logic elements. The NOR gates usually incorporate a diode positive OR gate driving the base of a PNP transistor which inverts and amplifies the diode gate output. The result is that, when the transistor is conducting, there is a logic "1" at the output, and when the transistor is turned off there is a logic "0" at the output. In the particular circuitry employed, the logic "1" is represented by a voltage of approximately five volts above ground (or zero) voltage. A logic "0" is at approximately ground potential and will be present at the output of a NOR gate unless all inputs are at logic "0."

Throughout the logic diagram, the various elements are identified by a prefix letter, a number, and a suffix letter. The suffix letter of the identifying legend will refer to one or more output lines or terminals which the element may have and which are designated on the logic diagram. The prefix letter is not, however, related to any particular input or output.

The flip-flops have the common Eccles-Jordan configuration. Set and clear inputs consist of pulse gates. A standard flip-flop may be used throughout, employing two pulse gates with outputs coupled through a diode OR gate to the base of a transistor for setting the flip-flop, and two pulse gates with outputs coupled through a diode OR gate to the base of another transistor for clearing each flip-flop. In the logic diagram, all of the inputs of some of the flip-flops are used, and only some of the inputs are used for others. For example, in the first stage of the address counter of FIG. 4, in the flip-flop A2MN only one of the two available clear pulse gates for the flip-flop is used. The inputs to this clear pulse gate are designated "K" and "L," and "K" input being the pulse input as indicated by the step in the input line, and the "L" input being the level or enabling input and designated by the straight input line. In order to obtain an effective output from one of these pulse gates, it is essential that the level input be at a "1" state during and prior to a change from the "0" to the "1" state at the pulse input to the gate.

Both set pulse gate inputs for the flip-flop A2MN are used, one of these having the level input E and pulse input F, and the other gate having the level input C and pulse input D. The "1" in front of the level input C indicates that this input is always at the logic "1" level.

In all of the flip-flops, the output where there is a logic "1" when the flip-flop is set is identified by the numeral 1, and the output where there is a logic "0" when the flip-flop is set is identified by the numeral 0.

The single-shot circuits employed throughout are a modification of the flip-flops, where RC coupling, rather than DC coupling is used to provide feedback in the astable state. The inputs to the pulse gates which are used, are shown, and the output at which a logic 0 is present when the single-shot is in the stable state, is identified by a 0. When the single-shot is triggered to the astable state, a logic "1" is present at the 0 output and a logic "0" is present at the 1 output.

Figure 9:
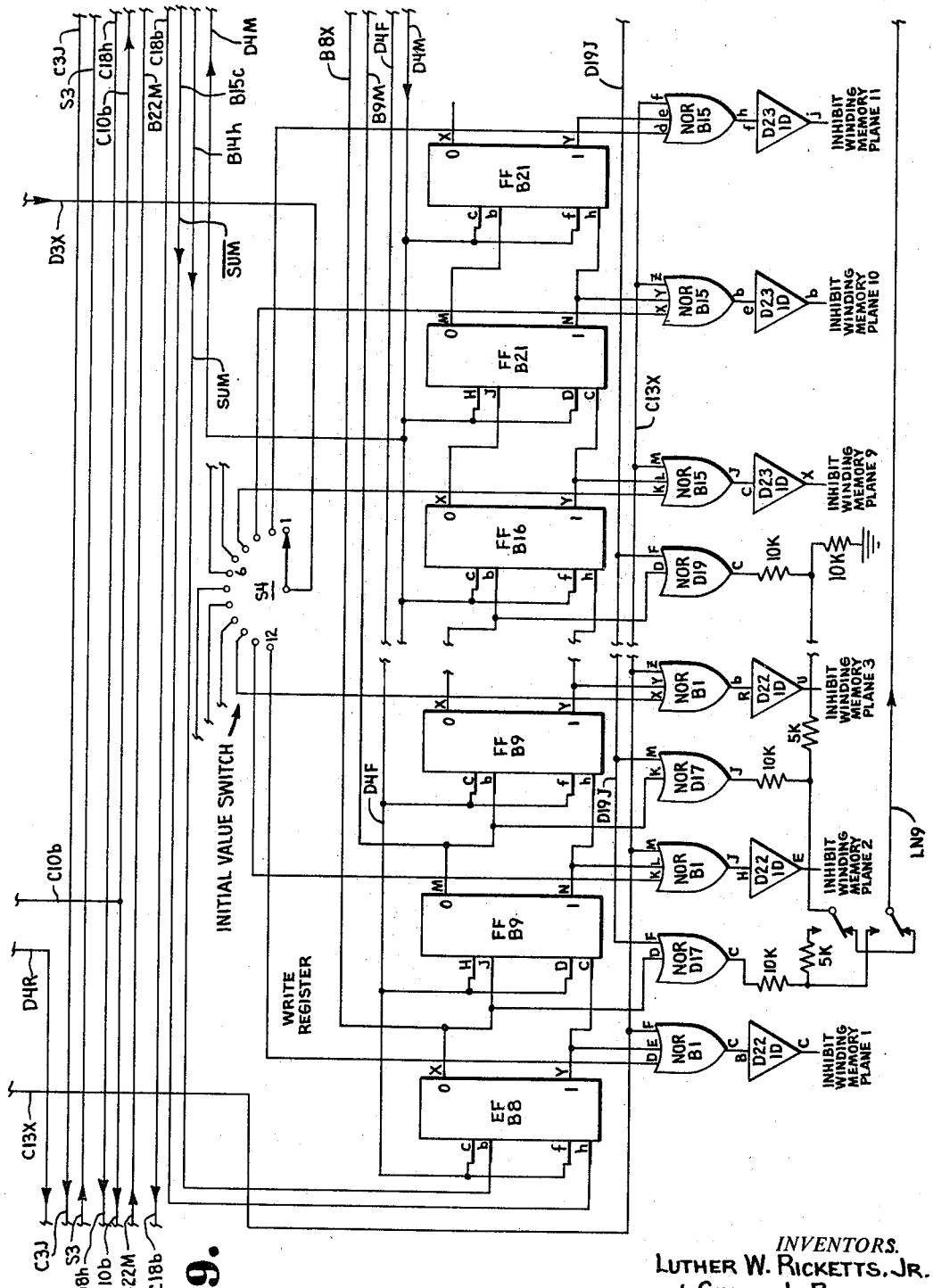
Figure 14:
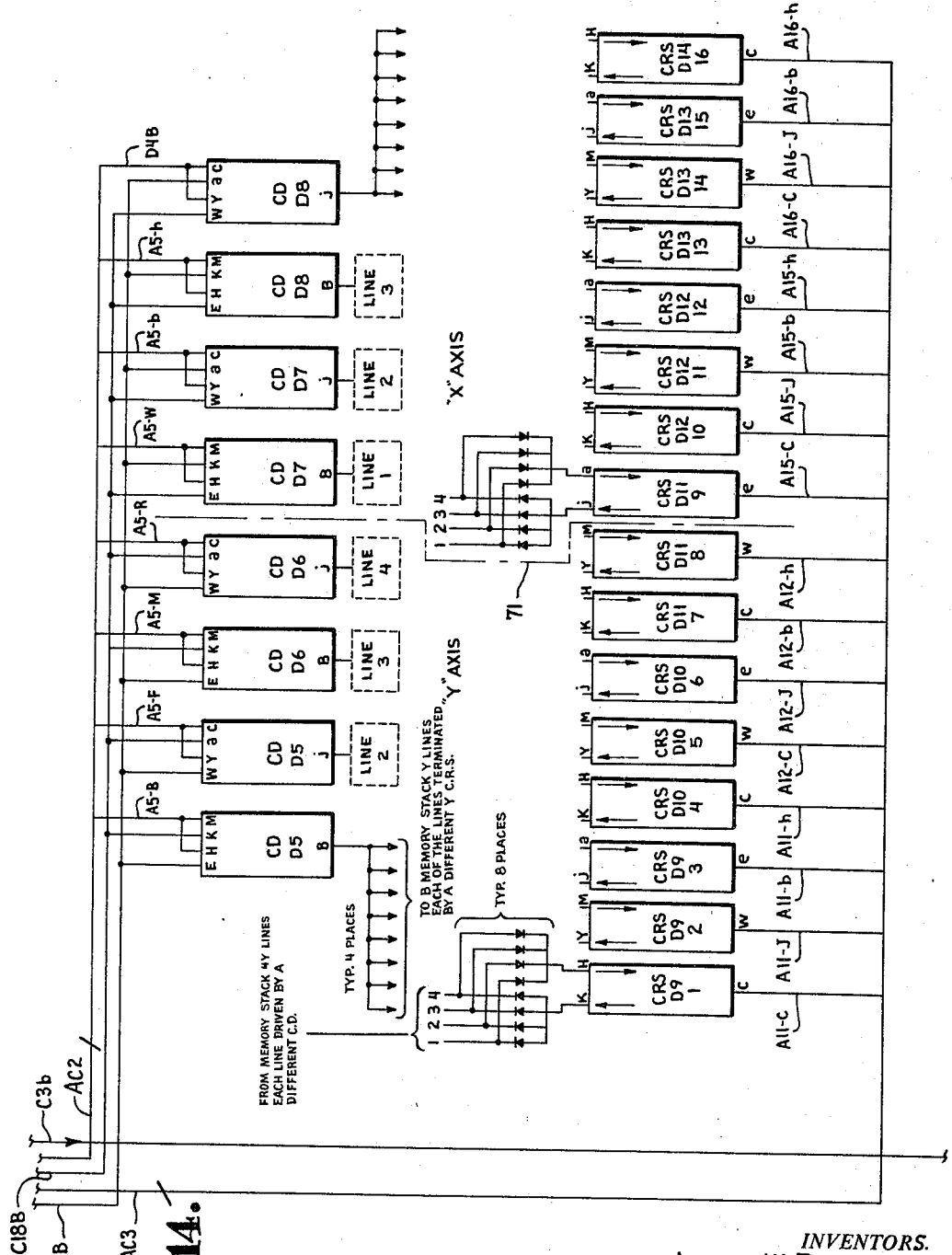

Emitter followers are used frequently where required to provide current gain and are designated in the logic diagram by triangles with "EF" therein. The sense amplifiers which are employed, are designated in FIG. 6 by the symbols with the "SA" therein. The current routing switches are shown in FIG. 14 and designated by blocks with "CRS" therein. The current drivers are also shown in FIG. 14 and designated by the blocks with the "CD" therein. The inhibit drivers are shown in FIG. 9 and are designated by the triangular blocks with "ID" therein. Like the flip-flops, and single-shots, these may all be of conventional construction.

Figure 4:
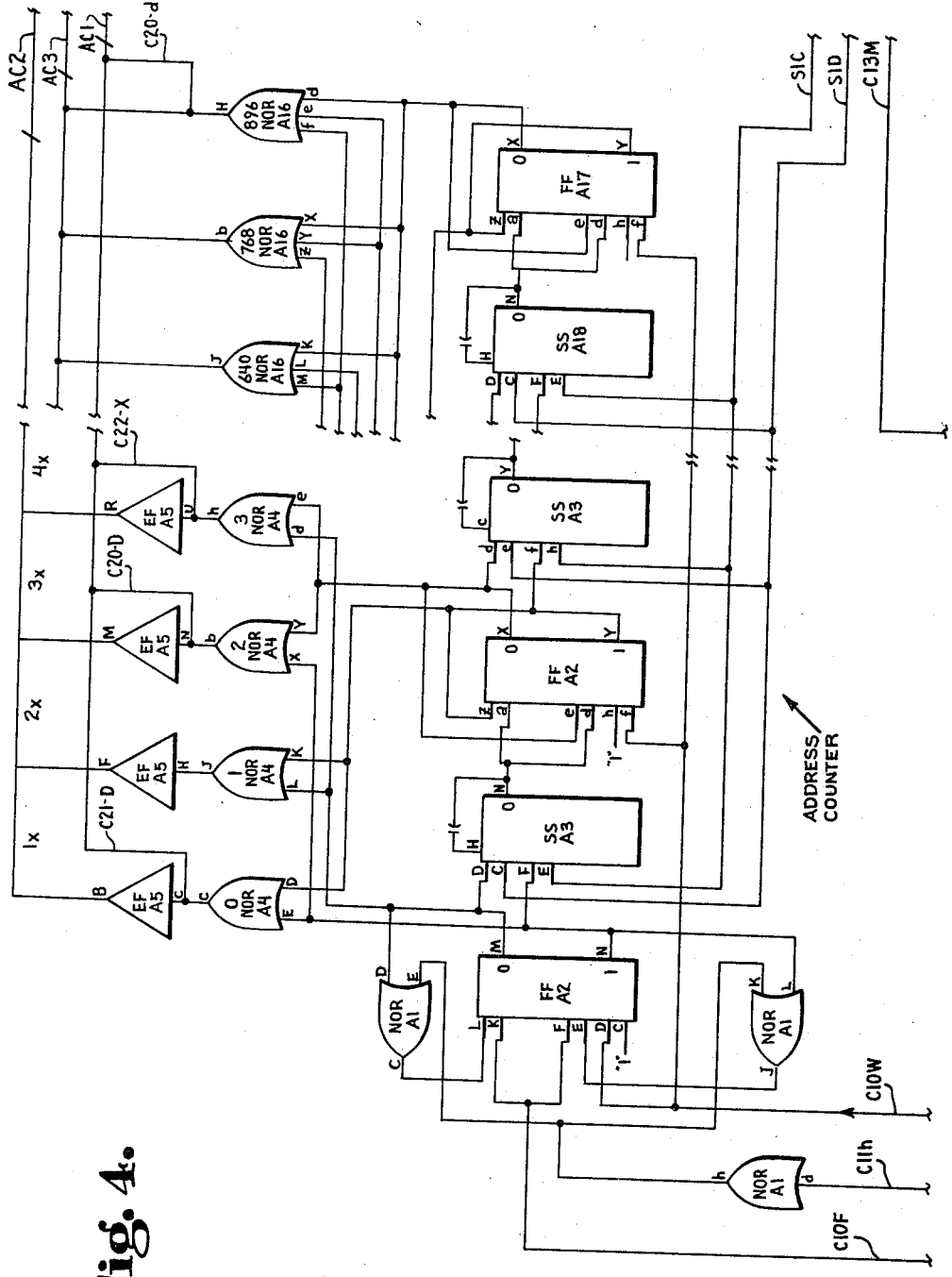
FIGS. 4 through 15 are portions of the logic diagram.

Referring further to the logic diagram of FIGS. 4 through 15, arranged in accordance with the drawing of FIG. 3, FIG. 4 shows the first two and last stage of the address counter, the other stages being omitted to conserve space in the drawing. This is a conventional 1024 count binary counter.

Figure 6:
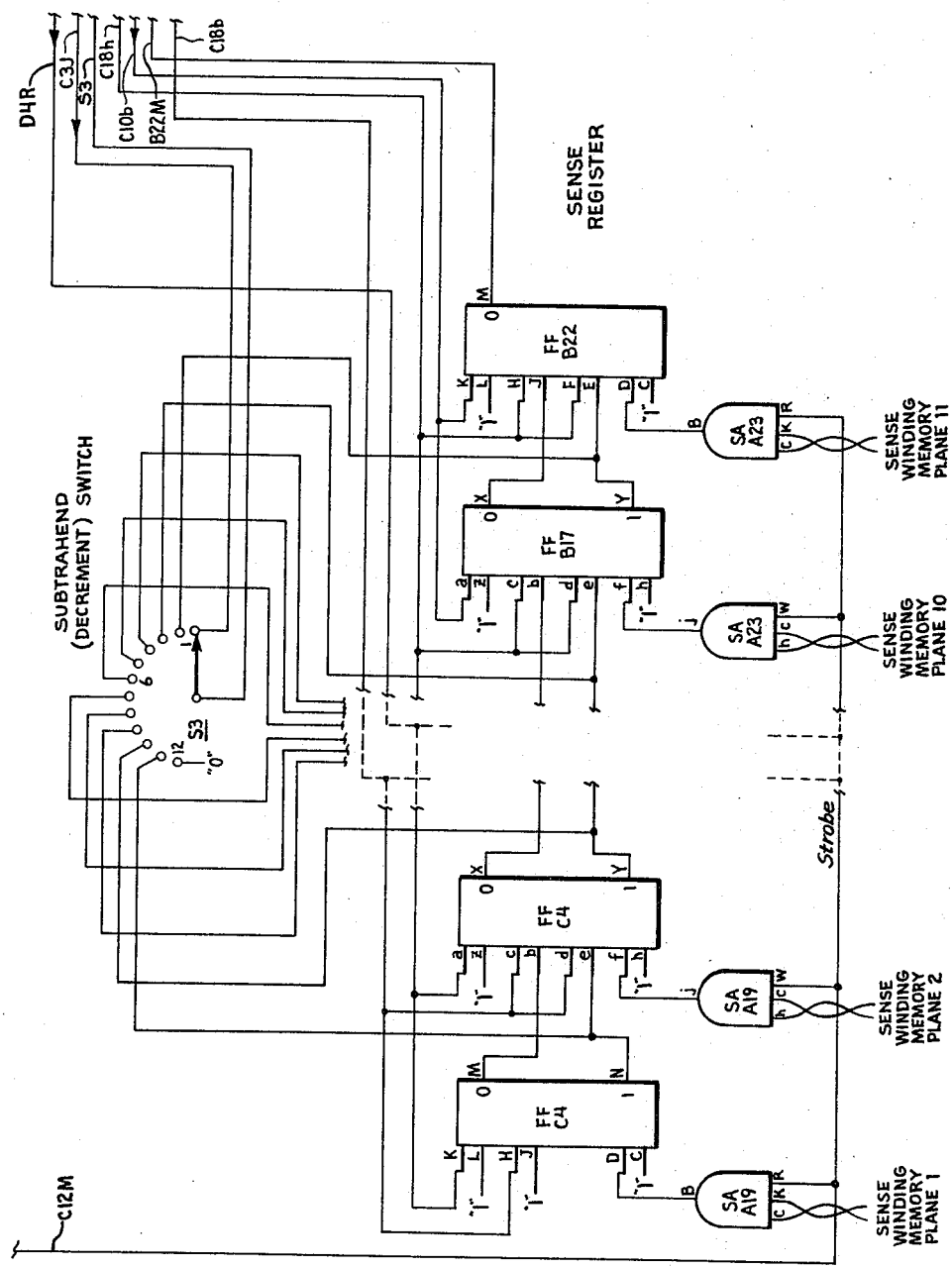

In FIG. 6, the first two stages and last two stages of an eleven stage shift register employed as a sense register are shown, the intermediate stages being omitted to conserve space in the drawing. Similarly, in FIG. 9, the first three stages and last three stages of an eleven stage write register are shown, this being a conventional shift register with the intermediate stages omitted to conserve space in the drawing. The remaining components are complete in the logic diagram except for certain of the decoding gates and wires associated with the address counter, certain of the switchable inputs to the sense and write registers, the memory planes, and some of the drivers and routing switches for the memory, others being shown, however, in FIG. 14.

Figure 5:
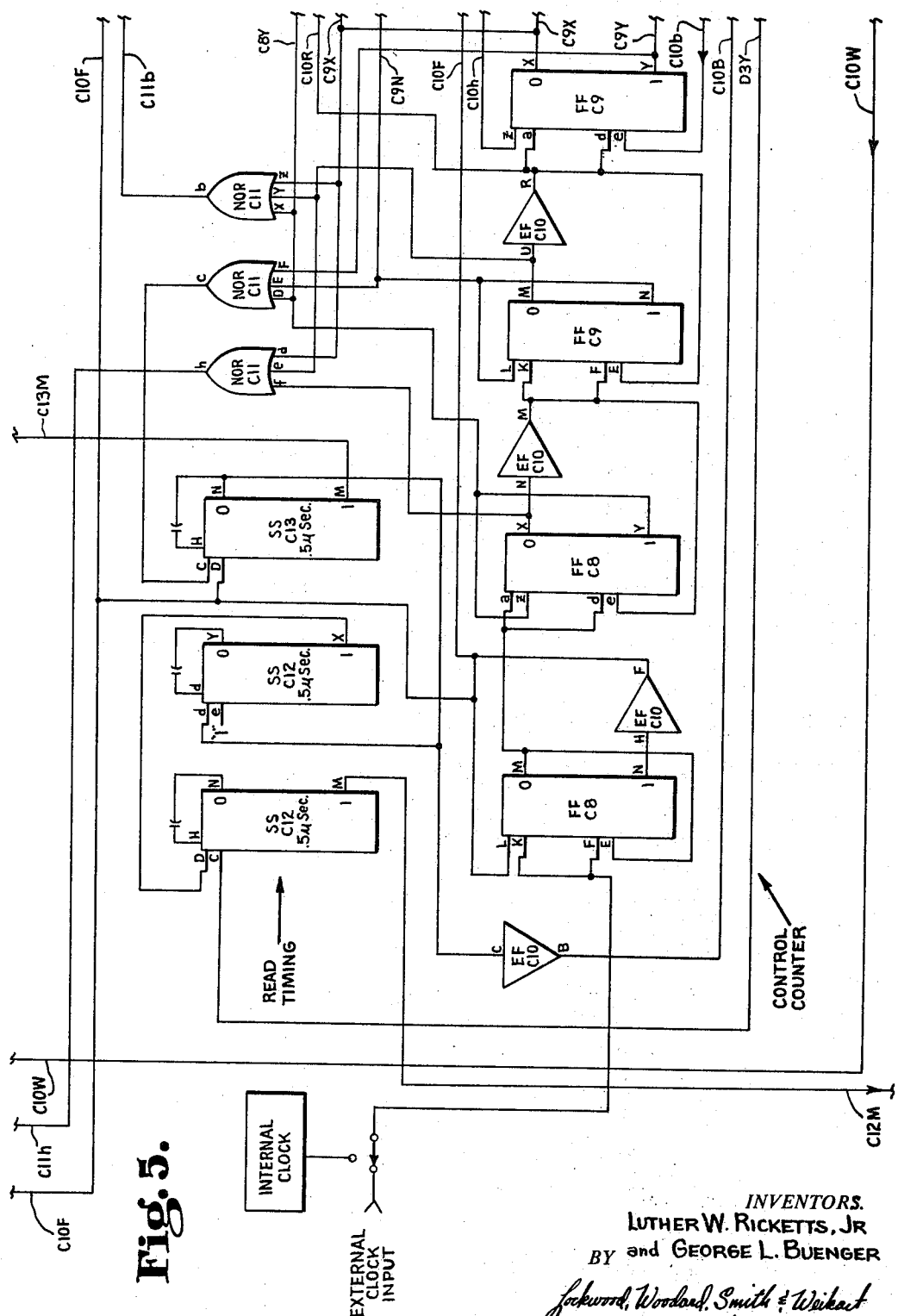
Figure 10:
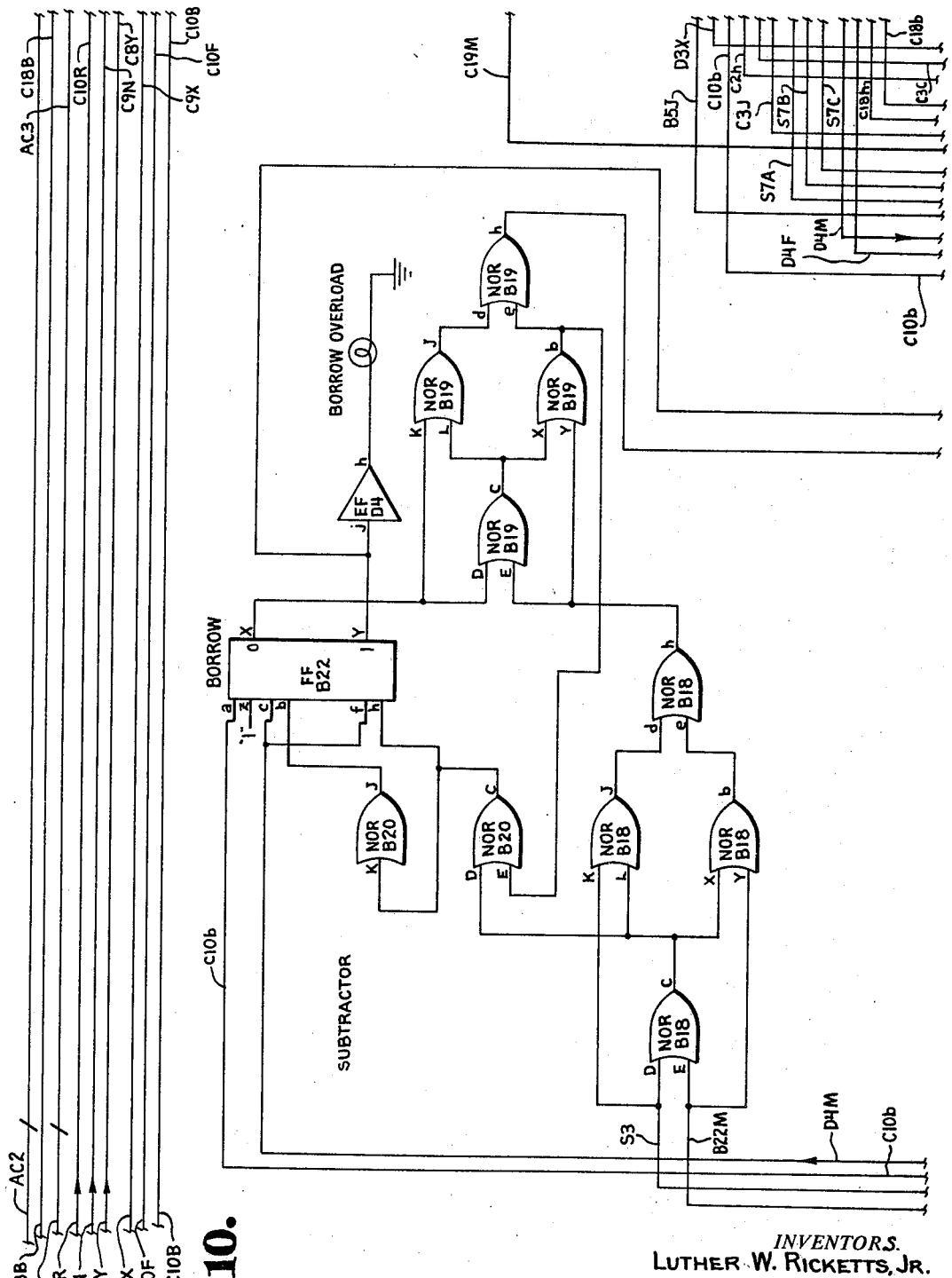
Figure 11:
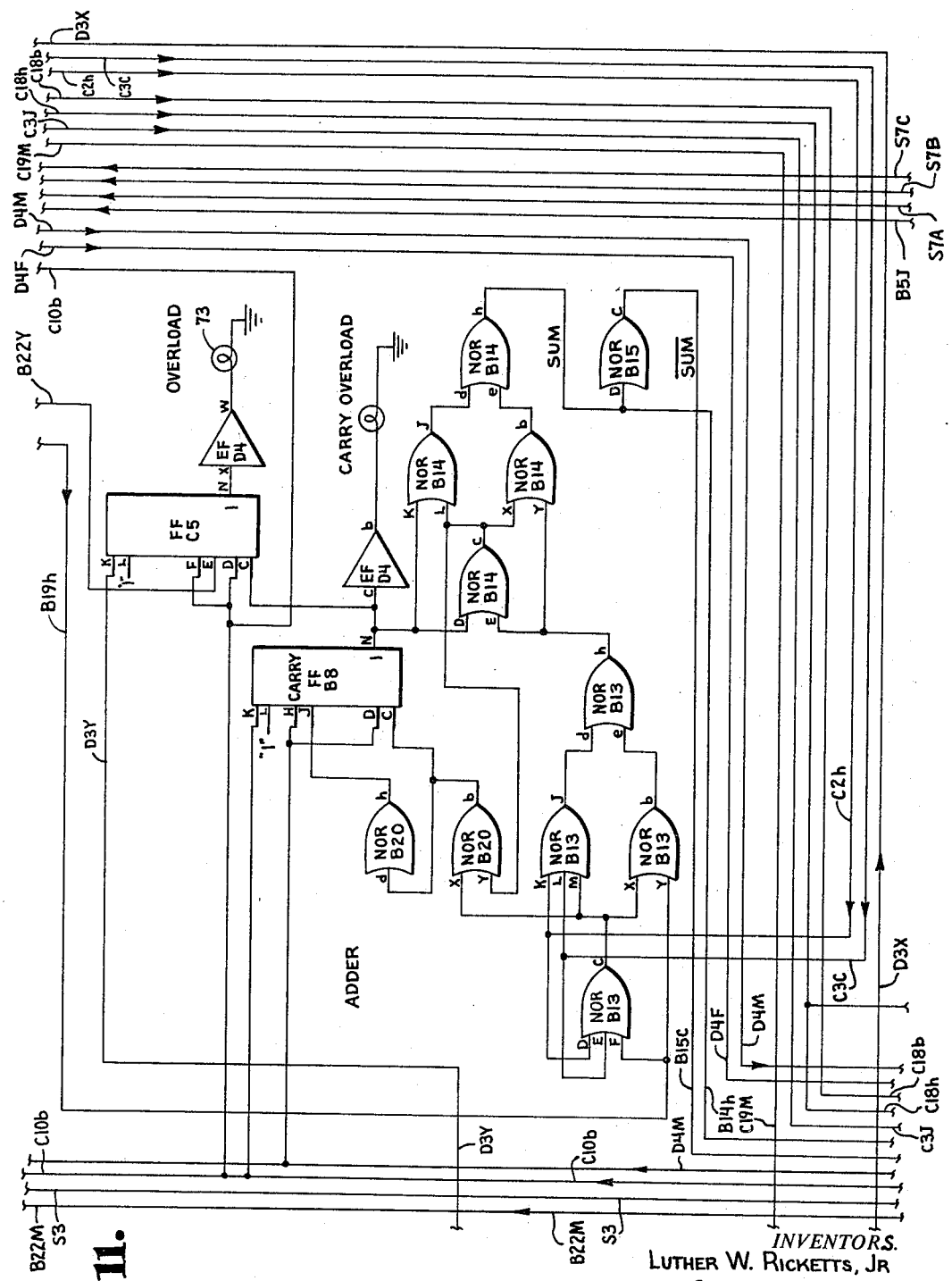

Describing components and events of FIG. 2 in more detail, with reference to the logic diagram, a clock pulse input at 38 drives the 16-count conventional binary control counter (FIG. 5 flip-flops C8MN, C8XY, C9MN and C9XY). Upon advance of the control counter from count 15 to count 0, the control counter causes the input sample counter (FIG. 13 flip-flops D2MN and D2XY) to be set to a zero count state, clears the borrow and carry flip-flops of the serial subtractor (FIG. 10) and serial adder (FIG. 11), respectively, clears the sense register (FIG. 6), and samples the state of carry and borrow flip-flops (FIGS. 11, 10).

Count 1 of the control counter starts a reading operation, by activating the read timing circuitry (FIG. 5 single shots C12MN, C12XY, C13MN). The address counter, being connected to the current drivers and routing switches (FIG. 14) will determine which memory address is read. The read timing circuitry then generates a strobe pulse reading the number out of that memory address into the sense register.

On counts 2 and 10 the state of the input signal is sampled when flip-flop D3MN (FIG. 13) is set. The setting of flip-flop D3MN will toggle the first stage of the input counter, flip-flop D2MN, provided the input signal is in a "1" state. Flip-flop D3MN is reset on counts 4 and 12 of the control counter.

On control count 8 the logic output of the threshold circuitry is sampled and a timing signal is sent to the initial cycle control block.

On count 11 of the control counter, it starts the shift generator (FIG. 13 single shots D1MN, D1Y, C1MN), which starts an arithmetic operation. During the arithmetic operation the input sample counter is held static. The shift generator is much faster than the control counter so the shifting from the sense register through the serial adder and subtractors for the arithmetic operation, and into the write register (FIG. 9) is completed between count 11 and count 13 of the control counter.

Figure 8:
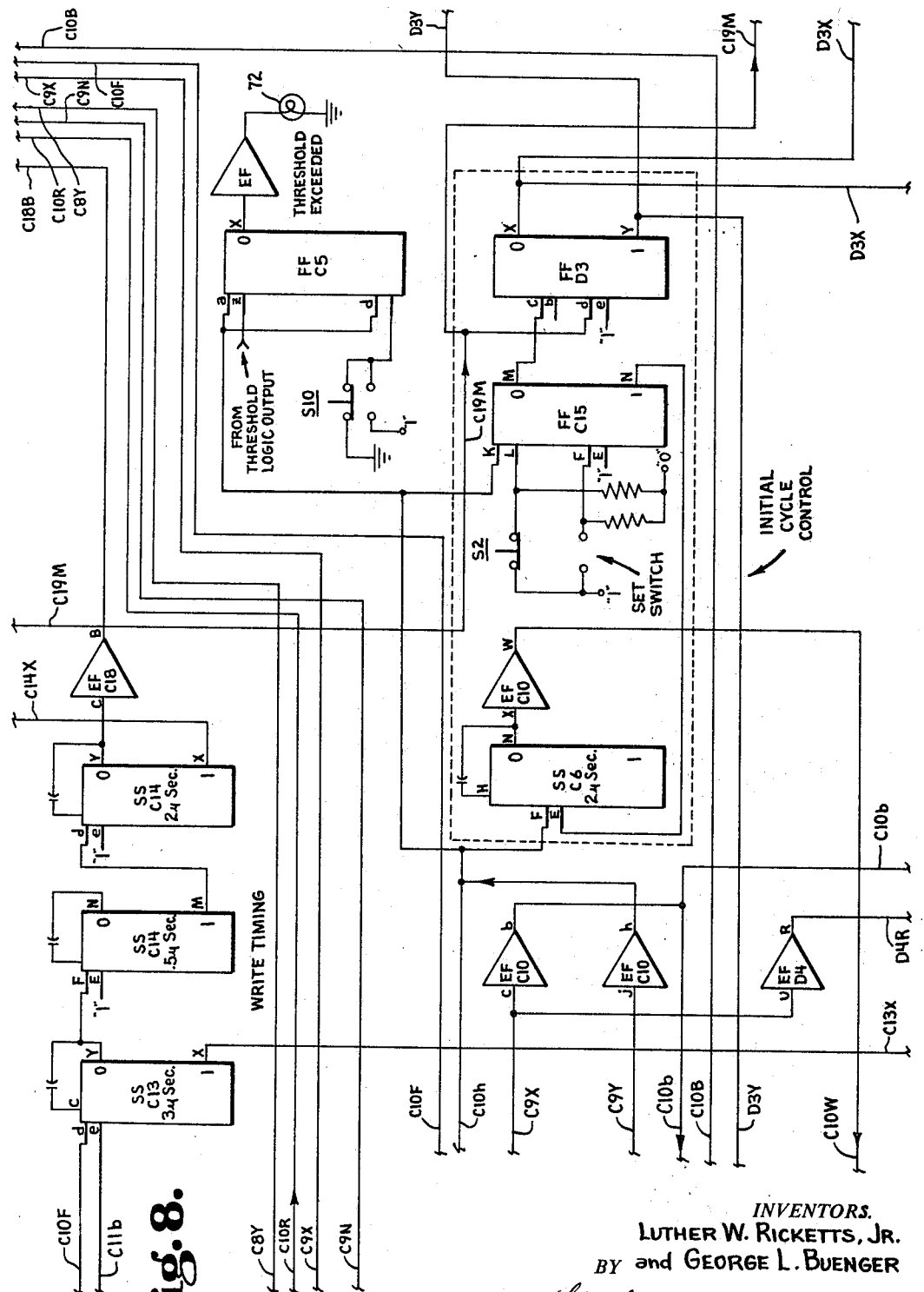

At count 13, the control counter starts a memory write operation, by activating the write timing circuitry (FIG. 8 single shots C13XY, C14MN, C14XY). The address counter causes the updated number in the write register to be written back into the address from which it was read before updating. At count 15 the control counter changes the state of the address counter.

If the "set switch" S–2 of the initial cycle control (FIG. 8) is in an actuated state, the address counter is set to all "1's" upon transition of the control counter to count 8.

Figure 12:
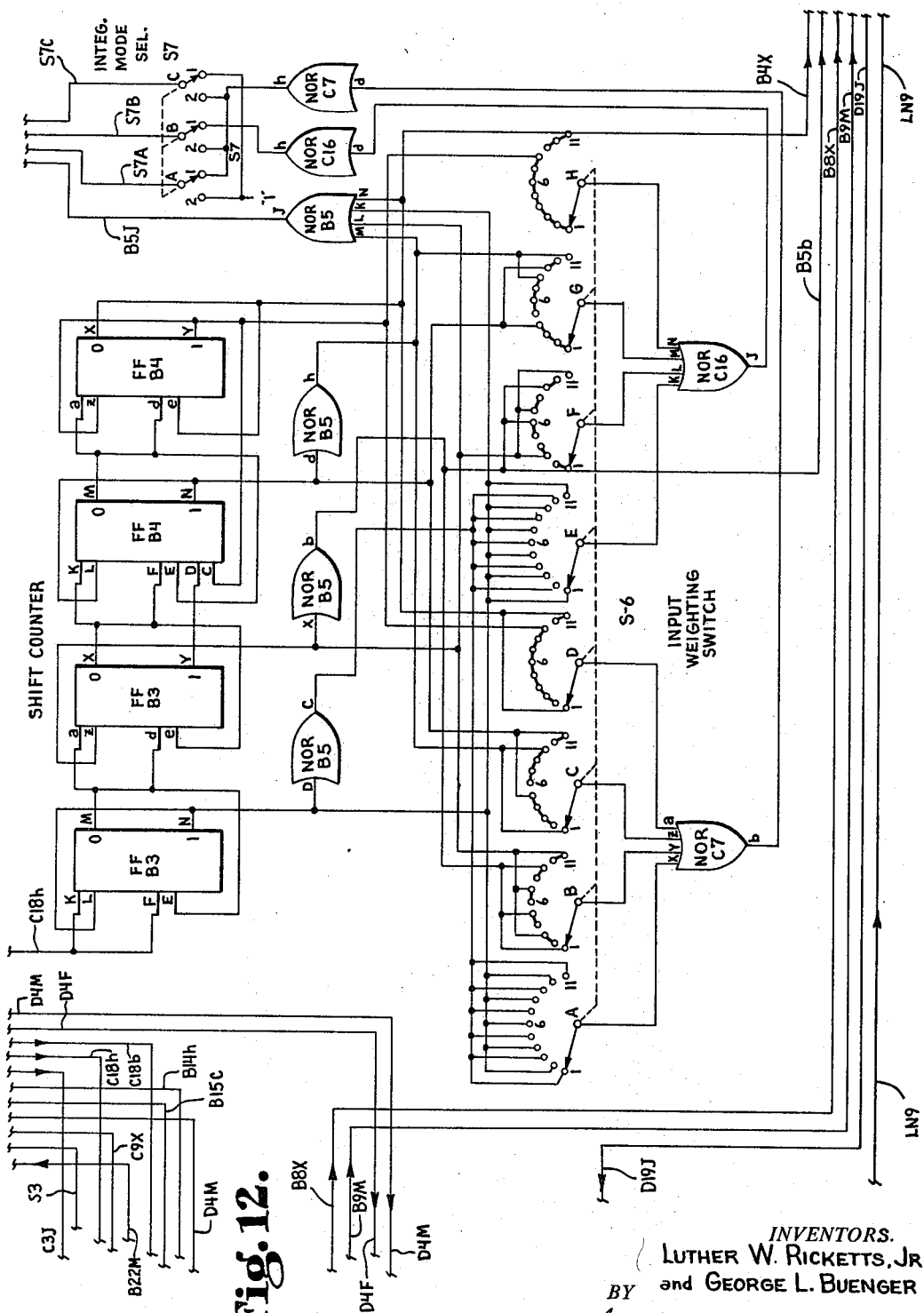

Arithmetic terms $X_1 2^{k1}$, $X_2 2^{k2}$, $X_0 2^{k1}$ and $X_2 2^{k1}$ mentioned hereinabove are generated by gating together outputs from the input counter and $2^{k1}$ and $2^{k2}$ signals generated by shift count decoding gates C7b and C16J (FIG. 12). The values of $k_1$ and $k_2$ are determined by the position of the input weighting switch S–6, which determines the inputs to the shift count decoding gates and thereby determines the counts decoded. The position of the integration mode selector switch S–7 (FIG. 12) determines whether a linear or RC integral is generated. If an RC integration, the position of subtrahend (decrement) switch S–3 (FIG. 6) influences the integration curve. Further reference to the logic diagram will be directed primarily to certain components and connections therein which are employed to achieve the previously described sequence of events.

In FIG. 14 of the logic diagram, eight current drivers and sixteen current routing switches are shown, those to the left of the line 71 being the "Y" axis drivers and switches and those to the right of the line 71 being for the "X" axis units. The line AC2 and AC3 in FIGS. 14 and 4 are slashed to indicate that they represent many lines from the various decoding gates of the address counter to the current drivers and current routing switches for addressing the memory.

In the address counter of FIG. 4, the flip-flops are coupled through single shots and which one of the two level inputs is a "1" determines whether the counter counts up or down. If the level inputs supplied by the line S1C are up, the counter counts down, and vice versa. The NOR gates decode the counter outputs and drive the current routing switches and drivers.

The pulse inputs of the first stage A2MN of the address counter are continuously pulsed by the first stage output C8N of the control counter. The level inputs of address counter flip-flop A2MN are held at a "0" state until the output from NOR gate A1h goes to "0" on counts 14 and 15 and the control counter. When the NOR gate output A1h does go to "0," one of the two level inputs to the first stage of the address counter will be up and the next pulse input thereto from the control counter will change the state of the address counter.

COUNT 0, CONTROL COUNTER

Since the control counter is a 1248 binary code counter, advance thereof from count 15 to count 0 causes flip-flop output C9X to rise. This rise coupled through emitter follower C10b sets both flip-flops of the input sample counter (FIG. 13), this being the zero count state for this counter, Also the rise through line C10b clears the borrow and carry flip-flops in the serial subtractor and serial adder, respectively. The rise of C9X also clears the sense register through D4R (FIG. 8).

The rise of flip-flop output C9X also, through line C9X, samples the state of the borrow and carry flip-flops in the serial subtracter and serial adder, respectively.

COUNT 1

On counts "0" and "1" of the control counter, the NOR output C11C thereof is at a "1" state, allowing the read single shot C13NM in the read timing circuitry (FIG. 5) to be triggered by the rise of counter flip-flop output C8N on count 1 of the control counter, to start the reading operation.

For this purpose, sense amplifiers of conventional construction may be coupled to the sense line from the memory. In FIG. 6, the coupling of each sense amplifier to a sense winding is indicated. For example, the sense winding inputs A19C and A19K are coupled to the sense winding of memory plane 1. The sense winding of memory plane 2 is coupled to the sense amplifier inputs A19h and A19c. The strobe signal to the sense amplifiers is derived from the read timing single shot C12M, and the coincidence of a sense input and a strobe signal sets a flip-flop in the sense register. The sense register is cleared prior to the sense strobe signal. The output C13N of the read signal shot, when triggered on count 1 of the control counter, as mentioned above, triggers the strobe delay single shot C12XY. A rise of C12X, as this single shot returns to the stable state, triggers the single shot C12MN, thus generating the negative strobe pulse at the output C12M. The level input C12C of the single shot C12MN, derived from the initial cycle control flip-flop output D3Y, is used to inhibit the strobe signal when that flip-flop is in a cleared state at the start of a cycle.

COUNT 2

Figure 13:
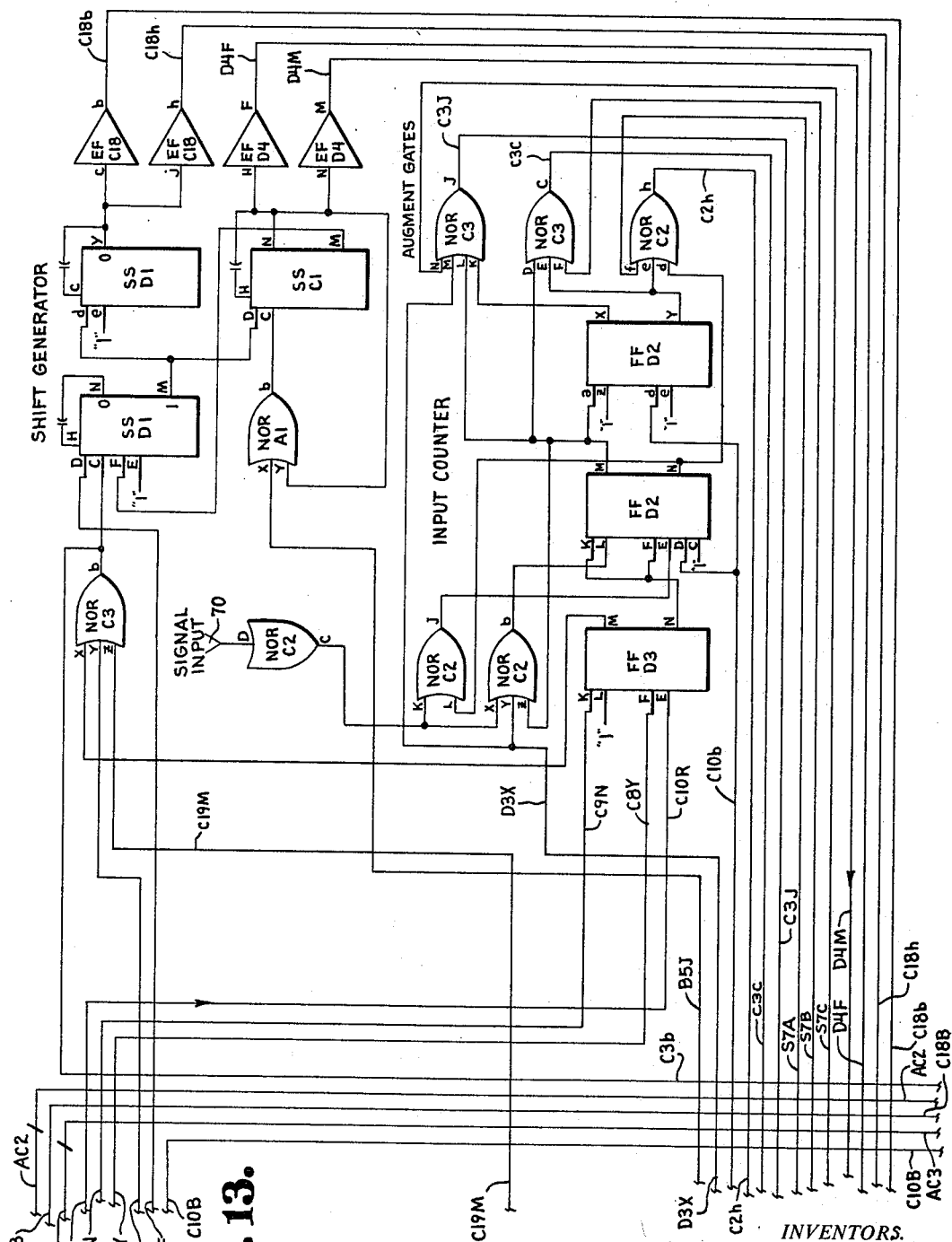

On transition of the control counter to count 2 the, rise of outputs C8Y, in conjunction with a "1" output from C9M through C10R sets the sample flip-flop D3MN FIG. 13). If the flip-flop D3XY in the initial cycle control block (FIG. 8) is set (as it normally is), and if the input signal at 70 to the NOR gate input C2D (FIG. 13) to the input counter is at a "1" state (which holds the output of NOR gate C2C at a "0" state), NOR outputs C2J and C2b are controlled by the state of the sample counter flip-flop D2MN and the setting of the sample flip-flop D3MN on count 2 of the control counter will toggle the flip-flop D2MN of the input counter. The clearing of D2MN causes the clearing of D2XY. Thus it is apparent that the condition of the input counter after having pulse inputs applied by the setting of the sample flip-flop D3MN will be determined by the input signal (at terminal 70 in FIG. 13) to be integrated. The following table shows the state of the set outputs D2N and D2Y of the input counter for various input counts.

| Input count | D2N | D2Y |
|---|---|---|
| 0 or set | 1 | 1 |
| 1 input | 0 | 0 |
| 2 inputs | 1 | 0 |

COUNTS 4–10

The sample flip-flop D3MN is cleared on count 4 of the control counter. It is again set on count 10 of the control counter and cleared on count 12 to accomplish the second sampling of the input.

On control count 8 the flip-flop output C9Y coupled through emitter follower C10h will reset flip-flop C5XY (FIG. 8) if level input C5Z from the threshold circuitry is a "1." If switch S10 is activated flip-flop C5XY will be set, if not already set. Flip-flop C15MN of the initial cycle control block (FIG. 8) will be reset if set switch S2 is not activated and the flip-flop is not already reset. If flip-flop C15MN is set prior to an 8 count, single shot C6MN will be triggered resulting in the setting of all address counter flip-flops.

COUNT 11

In view of the fact that the input sample flip-flop D3MN (FIG. 13) is set by count 10 of the control counter, and remains set until count 12, it provides an enabling input through NOR gate C3b to the shift generator single shot D1MN so that the rise of control counter flip-flop output C8N on count 11 triggers the shift generator single shot D1MN, thus starting an arithmetic operation. The rise of control counter flip-flop output C9N on count 12, then clears the sample flip-flop D3MN.

During the arithmetic operation between counts 11 and 13 of the control counter, the shift generator output from single shot D1Y is applied through lines C18b and C18h to the sense register whereby information is shifted from left to right in the sense register, and the flip-flop output B22M thereof drives the minuend serial subtractor input. The shift generator output through line C18h is also applied to the shift counter (FIG. 12). The following table shows the states of the set flip-flop outputs for the various counts in the shift counter.

| Shift Count | B3N | B3Y | B4N | B4Y |
|---|---|---|---|---|
| 1 | 0 | 0 | 0 | 0 |
| 2 | 1 | 0 | 0 | 0 |
| 3 | 0 | 1 | 0 | 0 |
| 4 | 1 | 1 | 0 | 0 |
| 5 | 0 | 0 | 1 | 0 |
| 6 | 1 | 0 | 1 | 0 |
| 7 | 0 | 1 | 1 | 0 |
| 8 | 1 | 1 | 1 | 0 |
| 9 | 0 | 0 | 0 | 1 |
| 10 | 1 | 0 | 0 | 1 |
| 11 | 0 | 1 | 1 | 1 |
| 12 or 0 | 1 | 1 | 1 | 1 |

This shift counter is a 12 count counter due to the 4 carry generated by the flip-flop inputs B4D and B4C. The NOR output B5J goes to a "1" state on count 11 of the shift counter and shuts off the shift generator. It does so by holding the level input for single shot C1 at the zero level. However, because the level input for single shot D1Y is fixed at the "1" state, this single shot will generate one more pulse to advance the shift counter from an 11 to a 0 count. This allows NOR gate output B5J to fall, enabling the NOR gate output A1b to be at a "1" state the next time single shot D1MN is triggered by the control counter.

The position of the input weighting switch S6 (FIG. 12), whose input contact points are supplied by the shift counter outputs, determines which of these outputs are used as inputs to the NOR gates C7b and C16J, the outputs of which are connected to the integration mode selector switch S7. The weighting switch is arranged so that when the ganged contactors are in any one of their eleven possible positions, the NOR gate output C7b therefrom is a "1" for a particular shift count, and the NOR gate output C16J is a "1" on the count following a "1" output at the NOR gate C7b. The NOR gates C7h and C16h supplied thereby, invert these outputs, which are then used through mode selector switch S7 to gate outputs of the input counter to the adder or subtractor networks during the processing of the binary digits specified by the position of switch S6.

Generally speaking, the illustrated embodiment and other possible embodiments of the invention integrates according to the equation $$I_{new} = I_{old} - \frac{I_{old}}{2^n} + XW$$

where $n$ is a value of a selected integer or may also be infinity, W is a weighting factor, and X is a variable depending on input signals sampled. W may have a constant selectable value, or may be a function of X, if desired. The arithmetic performed by the illustrated embodiment of the invention may be described by one or the other of the two more specific equations as follows:

(1) $$I_{new} = I_{old} - \frac{I_o}{2^n} + X_1 2^{k_1} + X_2 2^{k_2}$$

(2) $$I_{new} = I_{old} - X_0 2^{k_1} + X_2 2^{k_1}$$

The input weighting switch S6 determines the value of $k_1$ in the above equations, and, because of the double sampling which occurs in this particular embodiment of the invention, $k_2 = k_1 + 1$. Deending upon the position of the input weighting switch S6, $k_1$ can equal 0, 1, 2, 3, 4, 5, 6, 7, 8, 9, or 10. The arithmetic of RC Equation 1 is performed when the integration mode selector switch S7 is in position 1, and the linear integration represented by Equation 2 is performed when the integration mode selector switch is in position 2.

The value of "$n$" in the above equations can be set by the subtrahend or decrement switch S3 (FIG. 6). The value can be set equal to 1, 2, 3, 4, 5, 6, 7, 8, 9, 10 or infinity, depending upon the position of the decrement switch. The infinity value is obtained when the decrement switch is in position 12, which provides an all "0's" subtrahend input to the subtractor. With the subtrahend switch in position 12, no subtrahend is subtracted. A 0 subtrahend corresponds to an $n$ value of infinity. When a linear integration is to be performed, the subtrahend switch must be in position 1 in order for the output of gate C3J to act as a subtrahend input to the subtractor.

The above listed values of $k$, or $n$ are applicable in Equations 1 and 2 in logic wherein binary digits are coefficients for $2^0$ through $2^{10}$.

The function $$I_o - \frac{I_o}{2^n}$$

is generated in a serial form by taking the minuend input to the serial subtractor from the flip-flop output B22M, the last stage of the sense register (FIG. 6), and the subtrahend input from the flip-flop $n$ places to the left of flip-flop B22M in the sense register. It is in this manner that the position of the subtrahend switch S3 determines the subtrahend input to the subtractor, and thus determines the value of $n$ in the equation. The difference output in the subtractor is the addend input to the adder, whereas the augment (augend) input to the adder is derived from the C2h and C3C (FIG. 13) at the input counter output. Gates C3C and C3h are the augment gates of block 56. Since neither output C2h nor C3C can go to the "1" state until one of the NOR gate outputs C16h or C7h goes to a "0" state, and the inputs to these gates are determined by the position of the weighting switch, that switch S6 determines the value of $k_1$ in the two equations.

With switch S7 in position 1 for RC integration, according to Equation 1, the augment input to the adder from augment gate C2h will be a "1" during the processing of bit $(k_1+1)$ if the input counter is in a 1 count state and the augment input from augment gate C3C will be a "1" during the processing of bit $(k_1+2)$ if the input counter is in a 2 count state. With switch S7 in position 2 for linear integration, according to Equation 2, at which time S3 is also in position 1, the subtrahend input to the subtractor is derived from NOR gate C3J at the output of the input counter, and will be a "1" only when the $k_1+1$ bit is being processed and the input counter is in a "0" count state. The augment input from NOR gate C3C will be a "1" only during the processing of the $k_1+1$ bit when the input counter contains a 2 count. The output of gate C2h is held at "0" with switch S7 in position 2.

In the serial subtractor, which includes the NOR gates B18C, J, b, h, and B19C, J, b, and h, and B20C and J, the flip-flop B22XY is used to carry a borrow from one digit to the next. The NOR inputs B18E and B18Y, derived from the sense register flip-flop output B22M are the complement of the minuend. The subtrahend inputs B18D and K are derived from the subtrahend switch S3. Nor outputs B20C and B20J generate the borrow and the complement of the borrow outputs, respectively, and the borrow flip-flop B22XY is cleared on count 0 of the control counter, prior to an arithmetic operation. The difference output from B19h drives the addend input of the serial adder at the NOR inputs B13F and Y in the serial adder.

The serial adder consists of the NOR gates B13C, J, b, h, B14C, J, b, h, and NOR gate B20b and B20h and B15C. Carry flip-flop B8N, which is cleared on count 0 of the control counter prior to an arithmetic operation, carries the carry output from the one digit to the next. The augment inputs are B13E and L and B13D and K. The carry output and complement carry output are generated at NOR outputs B20b and B20h, respectively. The sum and complement are generated at NOR gate outputs B14h and B15C, respectively. Each time a shift pulse is generated by the shift generator, the following events take place:

Digits in the sense and write registers are shifted one place to the right. The adder output prior to the shift pulse is placed in flip-flop B8XY of the write register.

The carry and borrow outputs are stored in the associated flip-flops.

A "0" is shifted into the sense register flip-flop C4MN, insuring that all digits which would represent 2 to a power greater than 10 are "0."

The shift counter is advanced and determines (through weighting switch S6) whether or not an addend input should be gated to the adder.

COUNT 13, CONTROL COUNTER

After the arithmetic operation has been completed, the new word to be written back into the memory is located in the write register (FIG. 9). NOR gates connected to the outputs of the write register drive the digit drivers. The digit pulse input to these NOR gates is derived from the single shot C13XY of the write timing circuitry in FIG. 8. This input allows a digit driver pulse only during a "0" output C13X, and this occurs when the single shot is triggered by the rise of flip-flop output C8N of the control counter on count 13. In this way, count 13 starts the memory write operation.

During the digit pulse from the write timing flip-flop C13X, a "1" input at one of the write register output NOR gates from a write register flip-flop which is in the set state, will prevent a digit driver current pulse and will allow coincident write currents to switch the addressed core to a "1" state. The "0" input to a write register NOR gate from a cleared write register flip-flop, permits the digit driver current pulse, which inhibits the switching of the addressed memory core. Thus the core will remain in the "0" state generated by prior coincident read current. The third input to the digit driver NOR gates in the write register is derived from the initial value switch S4 and can only be a "1" when the flip-flop D3XY in the initial cycle control is in a cleared state. During normal operation of the integrator, this flip-flop is, however, in the set state.

Further with reference to the writing operation, when the write single shot C13XY is triggered, the rise of C13Y triggers the write delay single shot C14MN. When this single shot returns to stable state, the single shot C14XY is triggered, and the rise of the output C14Y thereof drives the write inputs of the current drivers of the memory. The driver which produces a write pulse is determined by the state of the address counter.

Figure 15:
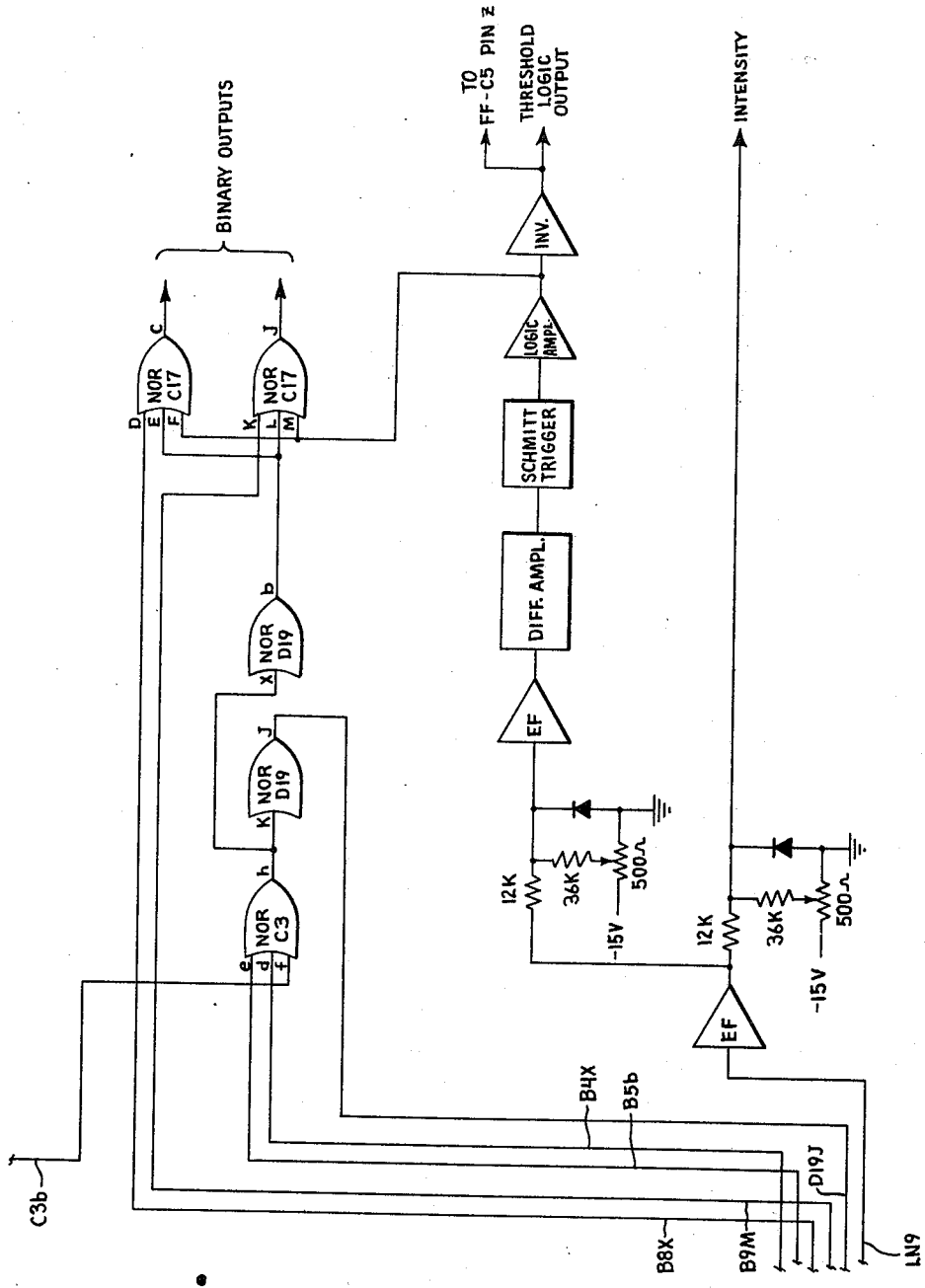

The threshold circuitry is driven from the write register through the NOR gates whose outputs are connected to the ladder network (FIG. 9). The state of switch S9 shown at the end of the ladder, determines whether or not the eleventh binary bit is used to generate the analog signal. The analog signal thus produced on the line LN9 from the ladder network is coupled through an emitter follower to two voltage dividers (FIG. 15). The second leg of each voltage divider is connected to a potentiometer, as indicated, to set the threshold voltage. The output of neither divider will rise above ground until the specified threshold voltage has been exceeded by the ladder network. By the illustrated arrangement, the intensity output from the first voltage divider is clamped at ground until some voltage greater than the threshold voltage appears at the ladder output. The intensity output may be used to drive a pen recorder synchronized with the address counter.

The output of the second voltage divider is coupled through amplifier and shaping circuits, resulting in a "1" output at the threshold logic output terminal when the threshold voltage is exceeded by the ladder output. The line C5Z connected to this output is applied to the clear enable input of flip-flop C5Z of the threshold indicator (FIG. 8) to enable sampling of the threshold output when the control counter advances to an 8 count, which pulses the clear pulse input to the flip-flop C5X. If the threshold is exceeded, the flip-flop C5X will be cleared and the indicator light 72 will be turned on.

Flip-flop C5X will be set to turn off the light when the control counter reaches count 8 the first time after switch S10 is activated.

NOR gates C17C and J (FIG. 15) are useful to gate out the two most significant digits in the write register when the input thereto from the threshold circuitry goes to a "0" state, which occurs when the threshold has been exceeded. A third input to these gates from the NOR gate output D19b (FIG. 15) prevents an output while the contents of the write register are being shifted.

COUNTS 14 AND 15

On counts 14 and 15 of the control counter, a "1" output at the decoding NOR gate C11h thereof, inverted by the NOR gate A1h, will result in a "1" input at one level input of the address counter first stage flip-flop A2MN. Therefore a rise of control counter flip-flop output C8N on count 15, will change the state of the address counter.

For an overload indicator, the flip-flop C5MN (FIG. 11) is provided to operate the overload indicator light 73 when the flip-flop is set. The setting is enabled when either the borrow or carry flip-flop is set, and the set pulse inputs of the overload flip-flop are pulsed by a rise of the control counter flip-flop C9X on count 0 of the control counter. A set level input will only be at a "1" state at this time if a carry or borrow has been generated by the processing of the eleventh digit, indicating that a number outside the radix of the memory word has been generated. The type of overload and the number of addresses so affected may be determined by observing the individual indicator lights driven directly from the borrow and carry flip-flops. The borrow overloads can occur only when the arithmetic is operating according to Equation 2, for the linear integration.

To start a new cycle of operation and integration, the initial cycle control is provided, with a "set switch" S2 therein (FIG. 8). Activation of the set switch sets the flip-flop C15MN, and the output C15N applied to the single shot C6N enables that single shot to be triggered each time the control counter output C9Y rises, which occurs on count 8 of the control counter. The trigger pulse output from this single shot is applied through emitter follower output C10W to each stage of the address counter and sets the address counter to the 1023 count state. The succeeding address advance signal from the control counter will advance the address counter to the zero count state.

When the switch S2 is released, flip-flop C15MN will be cleared upon the rise of control counter output C9Y the first time the counter reaches count 8 after release of the switch. Clearing of the flip-flop C15MN removes the enable input from the single shot C6N and allows the address counter to advance beyond a 0 count and begins a new cycle of processing addresses. At the same time, the clearing of flip-flop C15MN results in the clearing of the flip-flop D3XY. With D3XY in a cleared state, the "1" input level to the strobe single shot is removed. This inhibits generation of a sense amplifier strobe pulse and therefore nothing but 0's will be shifted out of the sense register. A "1" input on the NOR gate inputs C3N and C2Y at the input counter (FIG. 13) insures that the write register will contain all 0's after the first arithmetic cycle. However, in order to permit writing of an initial value into the memory, an initial value switch S4 is provided. With the flip-flop D3XY in the cleared state, as it is on the first count 8 after the set switch is released, the D3X output thereof to the wiper of initial value switch S4 has a "1" thereon. By locating this wiper on one of the contacts of the switch, a "1" will be written into the designated core of the memory during the write operation, even though the write register has all 0's therein. In this way, a given initial value can be written into every address of the memory during the first complete cycle of the address counter after the set switch is released. Then, when the prescribed count of the address register is completed, as determined by the address counter control block (yet to be described) the rise of the flip-flop output C19M thereof will set the flip-flop D3XY, and normal operation of the sense strobe, arithmetic circuits, and write circuits, will take place.

Figure 7:
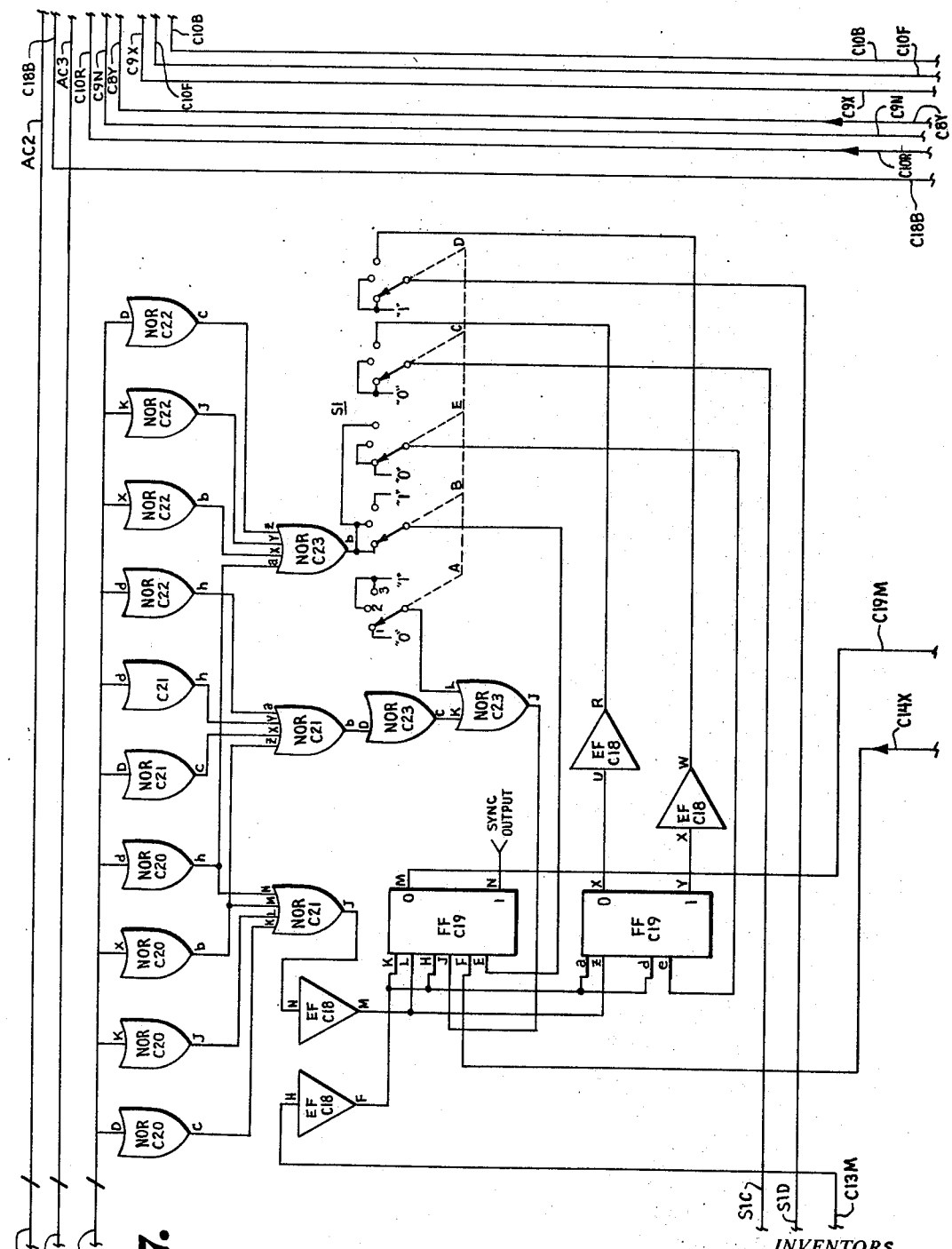

To add some versatility to the illustrated embodiment of the present invention, an address counter control is provided (FIG. 7), and includes a three NOR gates C21J, C21b and C23b which derive their inputs from the address counter block through the eight NOR gates at the top of FIG. 7, which act as signal inverters. The arrangement is such that the NOR gate output C21J will go to the "1" state on a 950 address count. NOR gate output C21b goes to the "1" state on address 440. When cycle length control switch S1 is in either position 1 or position 2, the address counter always counts up. However with switch S1 in position 3, the address counter is controlled by the state of the flip-flop C19XY because the switch contacts S1C and S1D are connected to the outputs of this flip-flop and, as mentioned above, when the line S1C to the address counter is up, the counter counts down and when the line S1D is up, the counter counts up.

When the address counter control switch S1 is in position 1, arithmetic operations are stopped after a count of 440 in the address counter. This is because the NOR gate output C21b of the address counter control (FIG. 7) goes to a "1" state at count 440 whereupon the output of NOR gate C23C goes to a "0" which, combined with the other input to NOR gate C23J from the switch section S1A, results in a "1" output to a clear enable input of the flip-flop C19MN. Therefore the return of the read single shot C13MN (FIG. 5) to the stable state after triggering on count 1 of the control counter, will pulse the clear input C19H of flip-flop C19MN producing a "1" at the output C19M thereof which, when coupled to the shift generator input NOR gate C3b disables the control counter from starting the shift generator. The rise of C19M will also set the flip-flop D3XY in the initial cycle control, if it has previously been in the cleared state. When the address counter advances to count 1023, the flip-flop C19MN will again be set by the rise of the single shot output C14X when it is triggered, the set enabling input to flip-flop C19MN being derived from the address counter control gate C23b through the switch section S1B.

When the switch S1 is in position 2, further arithmetic operations are stopped not at count 440, but rather at count 950. This is because the output from the address counter control NOR gate C21J goes to a "1" state at count 950, enabling the next pulse from the read single shot C13M to clear the flip-flop C19MN. Clear enable input C19J is held at a "0" state by a "1" input to gate C23J from switch S1. Just as with switch S1 in position 1, the flip-flop C19MN will again be set on count 1023 when the switch S1 is in position 2. When switch S1 is in position 3 the direction of the address counter reverses at count 950. The counter does not reverse when the address counter control switch S1 is in position 1 or 2, but starts a new cycle in the same direction, subsequent to the designated count.

The flip-flop output C19N from the address counter control, can be used as a synchronizing output signal to synchronize the input signal from block 66 (FIG. 2) with the address counter. This is because with the switch S1 in position 1 or 2, the set enabling input will rise only after the counter has advanced to count 1023. It can also be used when the switch S1 is in position 3, because then flip-flop C19MN will be cleared only on a 950 count. However the use of the output C19N for a synchronizing output assumes that the synchronizer advances at the same rate as the address counter so that the synchronizing pulse would be used for keying once for each run through the addresses being used in the integration process.

While an embodiment of the invention has been disclosed and described in some detail in the drawings and foregoing description, and integration on a time sharing basis is accomplished with serial arithmetic, shifting straight through parallel arithmetic, and other modifications, are also contemplated. Therefore the description herein is to be considered as illustrative and not restrictive in character, as other modifications may readily suggest themselves to persons skilled in this art and within the broad scope of the invention, reference being had to the appended claims.

The invention claimed is:
1. An integrating device comprising:
   a memory having a plurality of addresses therein storing numbers representing integrals of input signals;
   a first register having inputs coupled to said memory for receiving a number therefrom;
   a second register having outputs coupled to said memory for supplying a number thereto;
   arithmetic means coupled between said registers;
   memory addressing means;
   input means for input signals to be integrated;
   timing means establishing repetitive operating cycles and a predetermined sequence of address processing periods in each cycle, said timing means being coupled to said addressing means and to said registers to cause read out of a number from a memory address and writing of a number into said address during a processing period established by said timing means, said addressing means advancing to a different memory address for each processing period in a cycle, and said addressing means processing the memory address for each cycle of said repetitive cycles;
   and input sampling means coupled to said input means, for sampling input signals for each processing period, and coupled to said arithmetic means to employ input signals sampled during a processing period to change the number read out of a memory address during said period before writing back into said address, whereby after a plurality of said cycles, each memory address has a number therein which is the integral of input signals sampled during each period of processing that particular address; wherein said arithmetic and sampling means change the number $I_{old}$ read out of an address, to the number $I_{new}$ to be written back into the address, according to the equation:

$$I_{new} = I_{old} - X_0 2^k X_2 2^k$$

where $X_0$ and $X_2$ are variables, at least one of which has a value of zero as determined for each address processing period by the input signals sampled for that period, and $k$ is a value selectable from a group including integers and zero.

2. An integrating device comprising:
a memory having a plurality of addresses therein storing numbers representing integrals of input signals;
a first register having inputs coupled to said memory for receiving a number therefrom;
a second register having outputs coupled to said memory for supplying a number thereto;
arithmetic means coupled between said registers;
memory addressing means;
input means for input signals to be integrated;
timing means establishing repetitive operating cycles and a predetermined sequence of address processing periods in each cycle, said timing means being coupled to said addressing means and to said registers to cause read out of a number from a memory address and writing of a number into said address during a processing period established by said timing means, said addressing means advancing to a different memory address for each processing period in a cycle, and said addressing means processing the memory addresses for each cycle of said repetitive cycles;
and input sampling means coupled to said input means, for sampling input signals for each processing period, and coupled to said arithmetic means to employ input signals sampled during a processing period to change the number read out of a memory address during said period before writing back into said address, whereby after a plurality of said cycles, each memory address has a number therein which is the integral of input signals sampled during each period of processing that particular address; wherein said arithmetic and sampling means change the number $I_{old}$ read out of an address, to the number $I_{new}$ to be written back into the address, according to the equation:

$$I_{new} = I_{old} - \frac{I_{old}}{2^n} + XW$$

where $n$ is a value selectable from a group including integers and infinity, $W$ is a weighting factor and $X$ is variable according to the input signals sampled, and is determined for each address processing period by the input signals sampled for that period.

3. The device as set forth in claim 2 and further comprising:
manually operable multi-position switch means coupled to said arithmetic means for selecting the value of $n$.

4. The device as set forth in claim 2 and further comprising:
switching means coupled to said arithmetic means for programming $W$.

5. An integrating device comprising:
a memory having a plurality of addresses therein storing multi-bit word integrals of input signals from different sources;
a first register having inputs coupled to said memory for receiving a word therefrom;
a second register having outputs coupled to said memory for supplying a word thereto;
arithmetic means coupled between said registers;
memory addressing means;
timing means establishing repetitive operating cycles and a continuous sequence of word processing periods in each cycle, said timing means being coupled to said addressing means and to said registers to cause read out of an integral from a memory address and writing of an updated integral into said address during a word processing period established by said timing means;
said addressing means processing a different address for each word processing period in a cycle;
input sampling means for input signals derived from said sources, said input sampling means being coupled to said timing means for sampling input signals within a predetermined time period during said word processing period, and said input sampling means being coupled to said arithmetic means for updating an integral in accordance with the signals sampled during said word processing period;
shift means coupled to said timing means and said first register to shift an integral from said first register through said arithmetic means during said word processing period;
input weighting means coupled to said sampling means and to said arithmetic means, said weighting means being variable for weighting the input sample as desired;
decrement inserting means coupled to said arithmetic means and variable for changing the integration curve as desired;
and synchronizing means coupled between said sources and said input sampling means and coupled to said addressing means whereby words processed during successive word processing periods represent integrals of signals from individual ones of said sources.

6. An integrating device comprising:
a memory having a plurality of addresses therein storing multi-bit word integrals of input signals from different sources;
a first register having inputs coupled to said memory for receiving a word therefrom;
a second register having outputs coupled to said memory for supplying a word thereto;
arithmetic means coupled between said registers;
memory addressing means;
timing means establishing repetitive operating cycles and a predetermined sequence of word processing periods in each cycle, said timing means being coupled to said addressing means and to said registers to cause read out of an integral from a memory address and writing of an updated integral into said address during a word processing period established by said timing means;
said addressing means processing different addresses during different word processing periods;
input means for signals derived from said sources;
input counter means coupled to said input means to count occurrences of input signals of predetermined character received at said input means, said input counter means being coupled to said timing means and controlled thereby to count said occurrences during a first predetermined time period within said word processing period;
shift pulse generator and counter means having an input coupled to said timing means for initiation thereby after the said counting of occurrences, and having output means coupled to said registers and to said arithmetic means, and operable during a second predetermined time period within said word processing period to shift a word from said first register through said arithmetic means to said second register;
input weighting means coupled to said generator and counter means and to said arithmetic means, said weighting means being variable for weighting the input count as desired;
decrement inserting means operable and variable, when activated, to provide RC integration according to desired curves;
integration mode selector means coupled to said input counter and to said arithmetic means and operable in a first position to couple said decrement inserting means to said arithmetic means and to said input counter to cause a word $I_{old}$ stored in said first register to be updated according to the formula $$I_{new} = I_{old} - \frac{I_{old}}{2^n} + X_1 2^{k_l} + X_2 2^{k_l}$$

during shifting through the said arithmetic means to said second register, and said integration mode selector means being operable in a second position to cause a word $I_{old}$ stored in said first shift register to be updated according to the formula $$I_{new} = I_{old} - X_0 2^{k_l} + X_2 2^{k_l}$$

during shifting through the said arithmetic means to said second register, the value of $X_0$, $X_1$, and $X_2$ being determined by the results of the counting of occurrences prior to shifting the word $I_{old}$ from said first shift register, the said weighting means being operable to establish desired integer values of $k$;

said variable decrement inserting means being operable to establish desired integer values of $n$;

and digital to analog converter means coupled to said second register to convert the word $I_{new}$ to an analog output signal.

7. An integrating device comprising:

a magnetic core memory having a plurality of addresses therein storing multi-bit binary words representing integrals of input signals from different sources, said memory having a number of identical multi-core memory planes, the number of planes being equal to the number of bits desired for the words to be stored;

a first shift register having parallel inputs coupled to said memory for receiving a word therefrom;

a second shift register having parallel outputs coupled to said memory for supplying a word thereto;

serial arithmetic means coupled between said shift registers;

memory addressing means;

input signal synchronizing means coupled to a plurality of different sources of input signals and to said addressing means whereby each source is associated with a specific memory address;

a control counter driving said addressing means to establish repetitive cycles of word processing periods;

signal input counter means coupled to said synchronizing means to count "1" state input signals received from said synchronizing means, said input counter being coupled to said control counter and controlled thereby to sample the input signals two times during one full count period of operation of said control counter;

shift pulse generator and counter means having a start signal input from said control counter for initiation thereby after the said sampling of input signals two times, and having output means coupled to said shift registers and to said arithmetic means, and operable between predetermined counts of said control counter to serially shift a word from said first register through said arithmetic means to said second register;

manually operable, multi-position, input weighting switch means coupled to said generator and counter means and to said arithmetic means, manually operable, multi-position, integration curve selection switch means coupled to said arithmetic means and to said input counter means, a two-position manually operable integration mode selection switching means coupled to said input counter and to said arithmetic means and operable in a first position to cause a word $I_{old}$ stored in said first shift register to be updated to a new word $I_{new}$ according to the formula $$I_{new} = I_{old} - \frac{I_{old}}{2^n} + X_1 2^k + X_2 2^{k+1}$$

during shifting through the said arithmetic means to said second shift register, and said integration mode selection switching means being operable in a second position to cause a word $I_{old}$ stored in said first shift register to be updated according to the formula $$I_{new} = I_{old} - X_0 2^k + X_2 2^k$$

the value of $X_0$, $X_1$, and $X_2$ being determined by the results of the said sampling of input signals two times prior to shifting the word $I_{old}$ from said first shift register, the said weighting switch means having a number of positions equal to the number of memory bits per word and operable in each of said positions to establish an integer value of $k$ from among the integers in the series 0, 1, 2, 3, 4, . . . A–1, where A is the number of memory bits per word;

said curve selection switch means having a number of positions equal to the number of memory bits per word and operable in each of said positions to establish an integer value of $n$ from among the integers in the series 1, 2, 3, . . . A–1, and infinity;

digital to analog converter ladder network means coupled to said second shift register to convert the word $I_{new}$ to an analog signal;

and manually adjustable threshold and alarm means coupled to said converter means to produce an alarm whenever the word $I_{new}$ generated from signals derived from any of said sources exceeds a predetermined value.

8. The device of claim 7 and further comprising:

an address counter in said addressing means and coupled to said memory for addressing the cores therein;

and initial cycle control means including a manually operable set switch for resetting said address counter and said registers and including a manually operable, multi-position initial value switch for establishing an initial value in each memory address during the first addressing counter cycle of word processing periods.

9. An integrating device comprising:

memory means having a plurality of addresses therein storing numbers representative of integrals of input signals from different sources;

arithmetic means;

memory addressing means;

timing means establishing a continuous sequence of number processing periods and coupled to said addressing means and to said memory means to cause read out of a number from a memory address and passage thereof through said arithmetic means for updating, and writing of the updated number into said memory address during a processing period established by said timing means, said addressing means processing different addresses for different processing periods;

input sampling means for input signals derived from said sources, said input sampling means being coupled to said timing means for sampling input signals during each processing period, and said input sampling means being coupled to said arithmetic means for updating a number in accordance with signals sampled during said processing period;

and synchronizing means coupled between said sources and said input sampling means and coupled to said addressing means whereby numbers processed during successive processing periods represent integrals of signals from individual ones of said sources.

10. The device as set forth in claim 9 and further comprising:

input weighting means coupled to said sampling means and to said arithmetic means, said weighting means being variable for weighting the input sample as desired.

11. A device as set forth in claim 10 wherein:
said arithmetic means operates on an old integral $I_{old}$ and updates it to a new integral $I_{new}$ according to the equation $$I_{new} = I_{old} - X_0 2^k + X_2 2^k$$

wherein $k$ is determinable by said weighting means, and $X_0$ and $X_2$ are determined by the condition of input signals when sampled by said sampling means during the processing period for the old integral.

12. A device as set forth in claim 10 and further comprising:
decrement inserting means coupled to said arithmetic means and variable for changing the integration curve as desired.

13. A device as set forth in claim 12 wherein:
said arithmetic means operates on each old integral $I_{old}$ and updates it to a new integral $I_{new}$ according to the equation $$I_{new} = I_{old} - \frac{I_{old}}{2^n} + X_1 2^{k_1} + X_2 2^{k_2}$$

wherein $n$ is determinable by said decrement inserting means, $k_1$ is determinable by said weighting means, $k_2$ equals $k_1 + 1$, and $X_1$ and $X_2$ are determined by the condition of signals at the input when sampled by said sampling means during a processing period.

14. An integrating device comprising:
a memory having a plurality of addresses therein storing integrals of input signals from different sources;
a first register having inputs coupled to said memory for receiving an integral therefrom;
a second register having outputs coupled to said memory for supplying an integral thereto;
arithmetic means coupled between said registers;
memory addressing means;
timing means establishing a continuous sequence of processing periods, said timing means being coupled to said addressing means and to said registers to cause read out of an integral from a memory address and writing of an updated integral into said address during one of said processing periods established by said timing means;
said addressing means processing a different address in the memory for each processing period, so that a separate integral is processed during each said period;
input sampling means for input signals derived from said sources, said input sampling means being coupled to said timing means for sampling input signals during each processing period, and said sampling means being coupled to said arithmetic means for updating an integral in accordance with the signals sampled during the period;
shift means coupled to said timing means and to said first register to shift an integral from said first register through said arithmetic means during said processing period;
and synchronizing means coupled between said sources and said input sampling means and coupled to said addressing means whereby integrals processed during successive processing periods represent integrals of signals from individual ones of said sources.

References Cited

UNITED STATES PATENTS

| 3,094,609 | 6/1963 | Weiss | 235—152 |
| 3,093,730 | 6/1963 | Propster | 235—151.13 |
| 3,142,820 | 7/1964 | Daniels | 235—151 X |
| 3,274,376 | 9/1966 | Evans et al. | 235—150.31 |
| 3,374,463 | 3/1968 | Muir | 235—164 X |

OTHER REFERENCES

Lundh: A Digital Integrator For On-Line Signal Processing, IEEE Transactions on Electronic Computer, February 1963, pp. 26–28.

EUGENE G. BOTZ, Primary Examiner

D. H. MALZAHN, Assistant Examiner

U.S. Cl. X.R.
235—151.13, 152